Figure 1:
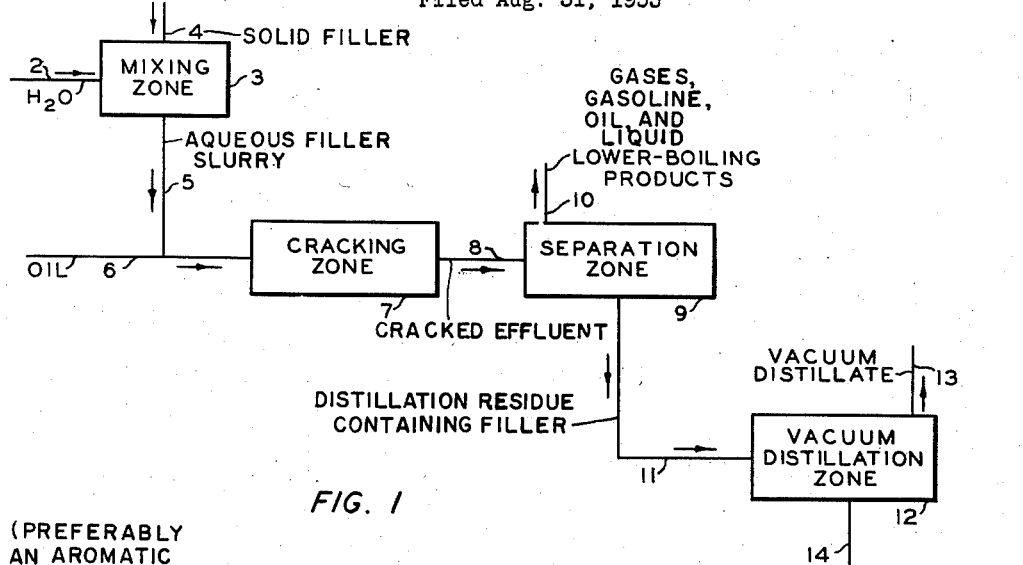

March 11, 1958 P. M. WADDILL 2,826,507
BINDER COMPOSITION AND METHOD OF PREPARING SAME
Filed Aug. 31, 1953

INVENTOR.
P. M. WADDILL
BY Hudson & Young
ATTORNEYS

2,826,507

BINDER COMPOSITION AND METHOD OF PREPARING SAME

Paul M. Waddill, Bartlesville, Okla., assignor to Phillips Petroleum Company, a corporation of Delaware Application August 31, 1953, Serial No. 377,313

17 Claims. (Cl. 106—284)

This invention relates to a composition useful as a binder in the production of molded carbonaceous articles. In one aspect, the invention relates to a method for the preparation of such a binder. In another aspect, the invention relates to such a binder prepared from materials of petroleum rather than coal tar origin. In another aspect, the invention relates to a method of preparing, from petroleum, an electrode binder having a high carbon content. In still another aspect, the invention relates to novel methods for the incorporation of a solid filler into a petroleum pitch.

In the production of molded electrodes, and other molded carbonaceous articles, such as fuel briquettes used as reducing agents in the smelting of ores, it is customary to mix coke, graphite, or coal, with a binder material to produce a plastic composition and to mold the plastic composition to the desired shape. The plastic composition ordinarily contains from 10 to 40 weight percent of the binder. In the case of electrodes, the molded composition is subsequently baked either in an oven or in place in an electrolytic cell. Such electrodes are commonly used in the electromechanical industry to produce metals such as aluminum. In the past, it has been general practice to use, almost exclusively, pitches of coal tar origin for the preparation of the binder. Pitches derived from petroleum have been unsatisfactory, evidently because of the relatively high hydrogen content of petroleum pitches as compared with coal tar pitches.

This invention provides a highly satisfactory binder for the production of electrodes and other molded carbonaceous articles such as fuel briquettes. The invention provides a binder prepared from a pitch of petroleum origin, thus providing the art with an additional source of materials for the preparation of electrode binders, which source has previously been thought to be unsatisfactory for that purpose.

According to this invention, there is provided a binder composition comprising a solid filler incorporated into a pitch-like residue of petroleum origin.

Further, according to this invention, there is provided a method which comprises mixing a petroleum oil convertible to a pitch-like residue with a solid filler, and vacuum distilling the resulting mixture to obtain a pitch-like residue of desired softening point and carbon content, which residue has been shown to be highly satisfactory as a binder material for the production of carbon electrodes.

According to one modification of the invention, a mixture of a petroleum oil and a filler is vacuum reduced to a softening point higher than that ultimately desired and a predominantly aromatic oil is added to the residue to lower the softening point to the desired value.

The softening point of the final binder composition is in the range 100 to 400° F., preferably 120 to 300° F., and more preferably 220 to 275° F., as determined by the ring-and-ball method (A. S. T. M. designation D36–26).

According to one modification of the invention, the mixture of filler and petroleum oil is vacuum reduced to obtain a pitch having a softening point in the range 300 to 400° F. and the minimum amount of aromatic oil is added to obtain the desired final softening point. This amount is ordinarily in the range 3 to 20 weight percent.

According to a further modification of the invention, a solid filler is dispersed in a predominantly aromatic oil and the dispersion is added to a petroleum pitch or to a petroleum oil convertible to a pitch-like residue as previously described. In a further modification, the predominantly aromatic oil can be mixed with the pitch-like residue and the filler can be added to the mixture, followed, if desired, by adjustment of the softening point, for example by removal of the aromatic oil or part thereof by distillation.

In the production of a binder suitable for use in the preparation of electrodes, it is highly desirable that the solid filler be intimately mixed with the pitch to obtain a uniform mixture. It is also desirable that occluded gases be removed from the solid filler to the greatest possible extent. The reason for intimately mixing and degassing is to provide ultimately an electrode free of void space so that the electrode will have maximum density, strength, and conductivity.

Thus, according to a further modification of the invention, a solid filler is admixed with a predominantly aromatic oil which is capable of wetting the filler. In order to provide maximum degassing of the solid filler, the oil-solid slurry is then maintained under reflux conditions for a time sufficient to remove occluded gas from the solid filler. The refluxed mixture is then added to the pitch-producing petroleum stock and the mixture is finally subjected to vacuum distillation to produce a residue useful as a binder, as aforesaid. The mixing of the slurry with the petroleum oil can take place in the vacuum distillation apparatus. A wetting agent such as an alkali-metal salt of an aromatic sulfonic acid or a lecithin derivative can be added to facilitate wetting of the filler by the oil.

According to a further modification of the invention, the free carbon content of the residual pitch-like material can be further increased by blowing air or other oxygen-containing gas through the residue at an elevated temperature. An oxidation catalyst of the type known in the art can be used during this operation if desired. Also, if desired, a further vacuum degassing of the blown residue can be utilized with benefit.

According to a further modification of the invention, a solid filler can be added to a petroleum cracking stock to form a slurry which is subjected to cracking conditions to produce a cracked product. The cracked product is then subjected to vacuum distillation to produce a pitch-like residue useful as an electrode binder. In one form of this modification, the filler can be mixed with water to form an aqueous slurry which is mixed with the cracking stock prior to cracking. The use of the aqueous slurry provides the advantages of reduced carbon formation during cracking and allows a greater degree of cracking to be effected without operating difficulties such as the coking and plugging of cracking coils.

According to a further modification of the invention, a petroleum cracking stock is divided into two portions, one of which is converted to carbon black in a carbon black production process of any of the types known in the art. Such an operation produces primarily a hot, carbon black-containing gas. According to this invention, the hot gas and carbon black are quenched by the addition thereto of the remaining portion of the oil. Thus a slurry of carbon black in the quench oil is obtained. This slurry is subjected to cracking and the cracked product containing carbon black is subjected to vacuum distillation to obtain a pitch-like residue containing carbon black which residue is particularly useful as an electrode binder.

Materials useful as solid fillers according to this invention include graphite, lamp black, acetylene black, other types of carbon black (e. g. high-pH furnace blacks and channel blacks), fresh or spent cracking catalyst (e. g. silica-alumina cracking catalyst, calcined bauxite, silica-zirconia catalyst and other catalysts known in the cracking art), aluminum oxide, powdered metallic aluminum, iron oxide, and limestone or other forms of calcium carbonate. One desirable type of carbon black is that produced according to Krejci, U. S. Patent 2,564,700 (1951). Such carbon black has a pH greater than 7, e. g. from 9 to 10. It is desirable that the solid filler be finely divided prior to use in the process of this invention, e. g. 50 mesh or finer. However, coarser solids, e. g. ¼-inch particles, can be ground with a portion of the pitch-forming oil and diluted with additional oil if desired.

The amount of filler added to the petroleum oil from which the pitch is derived is an amount sufficient to produce a final binder composition containing from 1 to 70 weight percent solids, preferably from 20 to 70 weight percent solids.

Petroleum oils convertible to pitch-like residues and useful in the process of this invention include topped crude oils, vacuum-reduced crude oils, gas oils, and relatively high-boiling aromatic extract oils. The oil should boil predominantly above 400° F., preferably above 700° F. Examples of such extract oils are those obtained by the solvent extraction of naphthene and aromatic containing petroleum fractions, for example by the use of solvent such as sulfur dioxide, nitrobenzene, furfural and other solvents well-known in the extraction art. Aromatic extract oil obtained by the solvent extraction of recycle gas oil in a cracking process is satisfactory.

As the aromatic solvent oil used to produce a slurry with the solid filler prior to incorporation into the petroleum oil from which the pitch is derived, the following are examples: aromatic extract oils produced from gasoline, naphtha or kerosene, aromatic kerosenes, anthracene oils and aromatic gas oils. The solvent oil should boil predominantly in the range 200 to 800° F., preferably 400 to 750° F. One highly desirable aromatic oil is the high boiling oil called distillate resin produced according to copending application, Serial No. 262,183, filed December 17, 1951, now U. S. Patent 2,691,621 of October 12, 1954. This oil is particularly desirable in the process of the present invention, since after vacuum distillation, it remains in the pitch-like residue and has a high carbon content.

The vacuum distillation to produce the pitch-like residue according to this invention can be practiced according to any of the vacuum distillation procedures known in the art. A particularly desirable procedure is that described in my copending application, Serial No. 400,450, filed December 28, 1953.

One modification of this invention, providing a highly desirable method of incorporating a solid filler into a petroleum pitch, is illustrated diagrammatically in Figure 1.

According to Figure 1, a solid filler of the type described and water enter mixing zone 3 through inlets 4 and 2 respectively. In mixing zone 3, an aqueous slurry is formed by methods known in the art. The slurry is passed through conduit 5 and mixed with oil entering the system through inlet 6. The resulting mixture is passed to cracking zone 7 where the oil is subjected to cracking conditions of temperature and pressure according to procedures known in the art. The effluent from cracking zone 7 passes through conduit 8 to separation zone 9 wherein lower-boiling products are separated and removed through outlet 10. These products ordinarily comprise hydrocarbon gases, hydrogen, gasoline, kerosene, and gas oil, together with water which was introduced into the system through inlet 2. A distillation residue containing the solid filler is passed through conduit 11 to vacuum distillation zone 12, from which a vacuum distillate is removed through outlet 13. A pitch-like residue comprising petroleum pitch with solid filler incorporated therein is removed through outlet 14 as the chief product of the process.

From the foregoing disclosure, it is evident that a suspended cracking catalyst can be used to facilitate cracking in cracking zone 7. In one modification of the invention, the filler added through inlet 4 can be a cracking catalyst used to effect the cracking reaction in zone 7. Also, ordinary thermal cracking can be used if desired.

Figure 2:
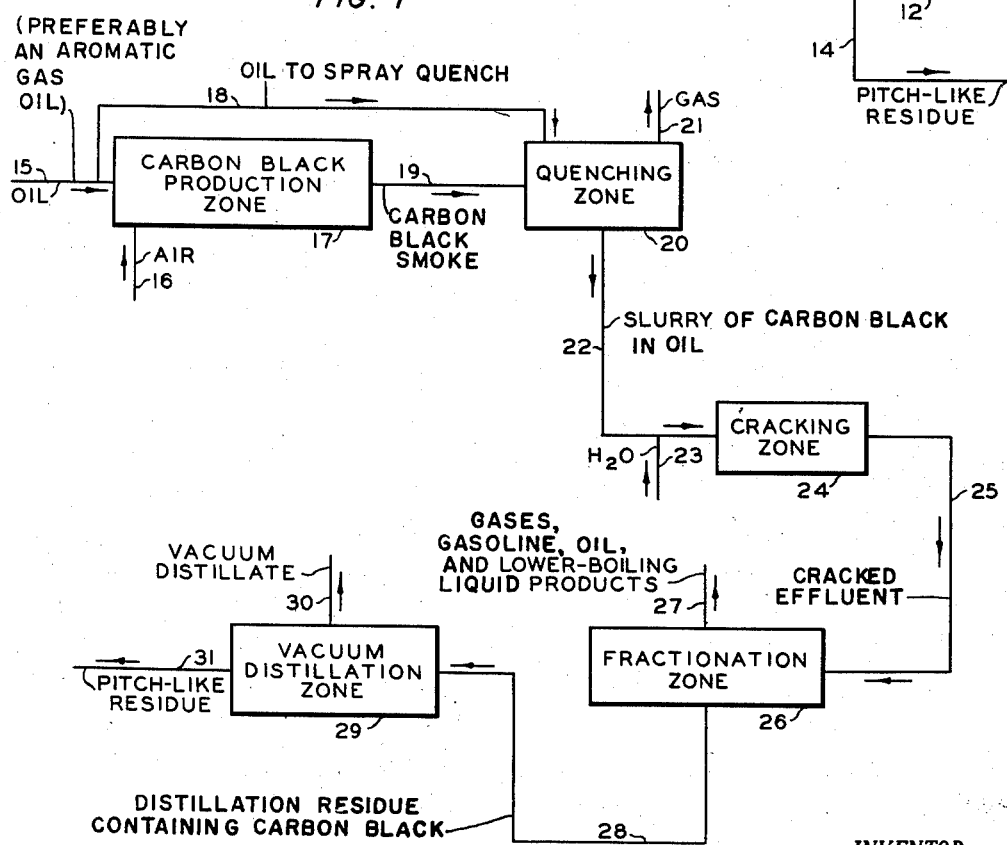

Another modification of the invention is illustrated diagrammatically in Figure 2.

According to Figure 2, an oil such as an aromatic gas oil is divided into two portions, one of which enters carbon black production zone 17 through inlet 15 and the other of which is passed to quenching zone 20 through conduit 18. Carbon black production zone 17 can include any of the types of carbon black production furnaces known in the art. The carbon black may be produced, if desired, by nonoxidative cracking or it can be produced by partial oxidation with air or other oxidizing gas according to processes known in the art. When air or other oxidation gas is used, it is supplied to zone 17 through inlet 16. The effluent from carbon black producing zone 17 is a hot suspension of carbon black in gases. This effluent passes through conduit 19 to quenching zone 20 to which is supplied the remaining portion of the aromatic oil through conduit 18. This portion of the oil suddenly cools the effluent from zone 17 and scrubs the carbon black therefrom. Scrubbed and quenched gas is withdrawn from the system through outlet 21 and the slurry of carbon black and oil produced in the quenching zone 20 is withdrawn therefrom through conduit 22 to cracking zone 24. If desired, water can be added to the cracking feed through inlet 23 to reduce coke deposition in cracking zone 24. The cracking in zone 24 can be conducted by thermal or catalytic cracking procedures known in the art. Cracked effluent, still containing carbon black, passes through conduit 25 to fractionation zone 26 from which lower boiling products such as gases, gasoline and light gas oil are withdrawn through outlet 27. Distillation residue containing carbon black passes through conduit 28 to vacuum distillation zone 29. Vacuum distillate is removed through outlet 30 and a high melting pitch-like residue containing carbon black is withdrawn as product through outlet 31.

*Example*

An electrode binder material according to this invention was prepared by mixing lamp black with a fuel oil, and subsequently subjecting the resulting mixture to vacuum distillation to obtain a pitch residue, and recovering the residue.

The fuel oil was a residuum, which is a liquid when heated above 172° F. but which is a solid below that temperature, obtained from the thermal cracking of a visbroken, vacuum-reduced, topped crude oil. It had the following properties:

| | |
|---|---|
| Softening point, ring-and-ball, ° F | 172 |
| Sp. g., 60/60 ° F | 1.1525 |
| Penetration, 0.1 mm.: | |
| 200 gm., 30 sec., 77° F | 11 |
| 100 gm., 5 sec., 77° F | 0–1 |
| 100 gm., 5 sec., 100° F | 11 |
| 100 gm., 5 sec., 115° F | 32 |
| 100 gm., 5 sec., 130° F | 67 |
| 100 gm., 5 sec., 150° F | 236 |
| Solubility, wt. percent, in— | |
| Carbon disulfide | 99.0 |
| Carbon tetrachloride | 83.5 |
| Acetone | 72.3 |
| Benzene | 97.8 |

| | |
|---|---|
| Volatile combustible matter, wt. percent | 63.2 |
| Fixed carbon, wt. percent | 36.7 |
| Ash, wt. percent | 0.1 |
| Sulfur, wt. percent | 0.96 |

The lamp black was ground to pass a 14-mesh, U. S. Standard No. 16 sieve. The fuel oil was heated to about 350° F., and the lamp black was slowly added over a 2-hour period with stirring, the mixture being maintained at a temperature from 300 to 400° F. The final mixture comprised 35 weight percent lamp black and 65 weight percent fuel oil.

The fuel oil-lamp black mixture was subjected to vacuum distillation under the following conditions:

Operating conditions:
| | |
|---|---|
| Wt. of charge, lb | 38.982 |
| Volume of charge, gal | 3.615 |
| Duration of run, hr | 5.5 |
| Flash temperature, °F | 650 |
| Flash pressure, mm. Hg | 5 |
| Flash temperature, corrected to 760 mm. Hg, °F | 995 |

Product yields:
| | |
|---|---|
| Gas oil distillate, lb | 9.143 |
| Gas oil distillate, gal | 1.013 |
| Gas oil distillate, wt. percent | 23.5 |
| Gas oil distillate, vol. percent | 28.0 |
| Pitch residue, lb | 29.839 |
| Pitch residue, gal | 2.602 |
| Pitch residue, wt. percent | 76.5 |
| Pitch residue, vol. percent | 72.0 |

The pitch residue, which had a softening point, ring-and-ball, of 311° F., was heated to about 400° F., and 10 weight percent of an $SO_2$ extract oil was added. The resulting mixture was stirred at about 400° F. for about 3 hours. The mixture was then subjected to flash vaporization to produce a pitch having a softening point, ring-and-ball, of 223° F. The resulting pitch contained 9 weight percent of the $SO_2$ extract oil.

The $SO_2$ extract oil was an extract oil obtained by extraction, with liquid sulfur dioxide, of a mixed recycle gas oil obtained from two catalytic cracking units. This mixed recycle gas oil had the following properties:

Distillation (ASTM D158-52), °F. at 760 mm.:
| | |
|---|---|
| IBP | 393 |
| 10 vol. percent condensed | 510 |
| 40 vol. percent condensed | 560 |
| 50 vol. percent condensed | 579 |
| 70 vol. percent condensed | 618 |
| 90 vol. percent condensed | 678 |
| EP | 718 |
| Recovery, vol. percent | 98 |
| API gravity at 60° F | 32.8 |
| Bureau of Mines correlation index | 35 |
| Conradson carbon residue, wt. percent | nil |
| Aniline point, °F | 162 |
| Color, NPA | 3 |
| Pour point, °F | +45 |

The extraction was conducted under the following conditions:

| | |
|---|---|
| Oil charge, bbl./hr | 588 |
| $SO_2$ charge, bbl./hr | 570 |
| Raffinate yield, bbl.hr | 410 |
| Extract yield, bbl./hr | 188 |
| Solvent: oil volume ratio | 0.97:1 |
| Extract yield, vol. percent of oil charge | 32.0 |
| Temperature of oil charge, °F | 67 |
| Temperature of $SO_2$ charge, °F | 60 |
| Extraction tower temperature, °F.: | |
| Bottom | 51 |
| Top | 57 |
| Temperature of extract phase passed to chiller, °F | 56 |
| Temperature of extract phase withdrawn from chiller, °F | 48 |
| Extraction tower pressure, p. s. i. g.: | |
| Top | 28 |
| Bottom | 52 |

The extract oil recovered by flashing the sulfur dioxide from the extract phase had the following properties:

Distillation (ASTM D158-52), °F at 760 mm.:
| | |
|---|---|
| IBP | 422 |
| 5 vol. percent condensed | 461 |
| 10 vol. percent condensed | 484 |
| 20 vol. percent condensed | 507 |
| 30 vol. percent condensed | 528 |
| 40 vol. percent condensed | 593 |
| 50 vol. percent condensed | 561 |
| 60 vol. percent condensed | 585 |
| 70 vol. percent condensed | 608 |
| 80 vol. percent condensed | 638 |
| 90 vol. percent condensed | 689 |
| 95 vol. percent condensed | 731 |
| DP | --- |
| EP | 745 |
| Recovery, vol. percent | 98.0 |
| Residue, vol. percent | 2.0 |
| API gravity, 60° F | 16.0 |
| Bureau of Mines correlation index | 83 |
| Sp. g., 20/4 °C | 0.9593 |
| Refractive index, 20° C | 1.5593 |
| Viscosity, SUS: | |
| 100° F | 41.9 |
| 210° F | 31.0 |
| Ramsbottom carbon residue, wt. percent | 0.60 |
| Sulfur, wt. percent | 0.7281 |
| Aniline point, °F | 41.0 |
| Pour point, °F | +5 |
| Flash point, Pensky Martin, °F | 204 |
| Bromine No | 25.3 |
| Olefins, vol. percent | 38.1 |
| Paraffins and Naphthenes, vol. percent | 20.0 |
| Aromatics, vol. percent | 41.9 |
| Pentane-insoluble, wt. percent | 0.08 |
| Color, NPA | too dark to measure |
| BS&W, vol. percent | 0.0 |

The following table shows a comparison of the petroleum pitch obtained according to this invention with a coal tar pitch:

| | Coal Tar Pitch | Petroleum Pitch |
|---|---|---|
| Softening point, cube-in-air method, °C | 63.8–70.8 | 111 |
| Ash, wt. percent | 0.03–0.07 | 0.10 |
| Coking value, wt. percent | 43.3–50.5 | 64.9 |
| Insoluble residue, wt, percent: | | |
| (Benzene) | 19.4–24.6 | 36.8 |
| (Nitrobenzene) C1 | 5.7–5.9 | 30.4 |
| (Acetone less C1) C2* | 21.0–21.1 | 25.9 |
| Distillation, vol. percent: | | |
| 20–170° C | nil–0.4 | 0.5 |
| 170–230° C | 1.2–2.5 | 1.9 |
| 230–270° C | 2.8–2.9 | 2.7 |
| 270–360° C | 13.3–13.8 | 11.4 |
| Residue | 80.4–82.7 | 83.5 |

*Total acetone-insolubles minus nitrobenzene insolubles.

The following table shows a comparison of the properties of carbon electrodes prepared by utilizing coal tar pitch and a petroleum pitch according to this invention as binders:

|  | Electrode with Coal Tar Pitch Binder | Electrode with Petroleum Pitch Binder |
|---|---|---|
| Baking loss (wt. percent) at 1,000° C | 14.1–18.6 | 11.2–12.8 |
| Baked density, gm./cc | 1.32–1.38 | 1.44 |
| Green density, gm./cc | 1.56–1.65 | 1.54 |
| Resistivity, (ohms cm.) × $10^{-4}$ | 60.9–70.6 | 68.8–71.8 |
| Compressive strength, kgm./cm.$^2$ | 238–345 | 315–322 |
| Binder, wt. percent | 28.0 | 32 |
| Coke, wt. percent | 72 | 68 |

The above data show that the electrode prepared with the pitch produced according to this invention was superior to electrodes prepared with coal-tar pitch binders, as regards baking loss and baked density, that it was approximately equal to the coal-tar pitch electrodes as regards compressive strength, and that, although the resistivity was somewhat higher than that of the electrode prepared with coal-tar pitch binder, the resistivity was nevertheless within a commercially satisfactory range.

Variation and modification are possible within the scope of the disclosure and the claims to this invention, the essence of which is that there has been provided a novel binder composition comprising a petroleum pitch and a solid filler and that such a binder is prepared by a novel method comprising incorporating a solid filler into a petroleum oil and vacuum reducing the resulting mixture to produce a pitch-like residue.

While certain structures, process steps and examples have been described for purposes of illustration, the invention is not limited thereto.

While the invention is particularly applicable to the production of binder compositions from petroleum oils, it can also be applied to the preparation of binder compositions from coal tar. For example, a solid filler can be added to liquid coal tar according to the procedures described herein, and the mixture can be distilled, as described herein, to produce a pitch utilizable as a binder.

I claim:

1. A process for producing a binder useful in the production of carbon electrodes, which process comprises mixing petroleum cracking stock boiling predominantly above 400° F. with a solid filler selected from the group of carbon type materials consisting of the carbon blacks and graphite, subjecting the mixture to vacuum distillation to produce a pitchy residue and recovering said residue.

2. A process which comprises mixing a petroleum cracking stock boiling predominantly above 400° F. with a solid filler selected from the group of carbon type materials consisting of the carbon blacks and graphite, vacuum distilling the mixture to obtain a residue having a ring-and-ball softening point in the range 300 to 400° F., adding predominantly aromatic oil to decrease the softening point to a value in the range 120 to 300° F. and recovering a pitchy residue.

3. A process which comprises adding a solid filler selected from the group of carbon type materials consisting of the carbon blacks and graphite, to a predominantly aromatic oil to form a slurry, adding the slurry to a petroleum cracking stock boiling predominantly above 400° F., subjecting the mixture to vacuum distillation to obtain a pitchy residue, and recovering said residue.

4. A process which comprises mixing a solid filler selected from the group of carbon type materials consisting of the carbon blacks and graphite, with a predominantly aromatic oil, subjecting the mixture to refluxing to remove occluded gas, adding the mixture to a petroleum cracking stock boiling predominantly above 400° F., subjecting the resulting mixture to cracking, vacuum distilling the cracked product to obtain a pitchy residue, and recovering said residue.

5. A process comprising mixing a solid filler selected from the group of carbon type materials consisting of the carbon blacks and graphite, with a petroleum cracking stock boiling predominantly above 400° F., subjecting the resulting mixture to cracking, distilling the cracked product to obtain a pitchy residue, blowing an oxygen-containing gas through said residue to increase the carbon content thereof, and recovering a blown residue.

6. A process which comprises dividing a petroleum cracking stock boiling predominantly above 400° F. into two portions, subjecting one portion to carbon black forming conditions to form a hot, carbon black-containing gas, commingling the other portion of the cracking stock with said gas to quench same and form a carbon black-oil slurry, subjecting said slurry to cracking, vacuum distilling the cracked product to obtain a pitchy residue, and recovering said residue.

7. A process according to claim 2 wherein said filler is lamp black.

8. A process according to claim 2 wherein said filler is graphite.

9. A process according to claim 2 wherein said filler is a furnace-type carbon black having a pH greater than 7.

10. A composition useful as a binder for molded carbonaceous articles having a ring-and-ball softening point in the range of 120 to 300° F., and having a coking value greater, and a baking loss at 1000° C. less, than coal tar pitch, which comprises a solid filler, predominately aromatic oil, selected from the group of carbon type materials consisting of the carbon blacks and graphite, and a pitchy material derived from a petroleum cracking stock boiling predominantly above 400° F.

11. A composition, useful as a binder for molded carbonaceous articles, having a ring-and-ball softening point in the range of 120 to 300° F., and having a coking value greater, and a baking loss at 1000° C. less, than coal tar pitch, which comprises carbon black, a pitchy residue derived from a petroleum cracking stock boiling predominantly above 400° F., and a predominantly aromatic oil.

12. A binder composition having a ring-and-ball softening point in the range 120 to 300° F., and having a coking value greater, and a baking loss at 1000° C. less, than coal tar pitch, and comprising from 1 to 70 weight percent carbon, from 3 to 20 weight percent of a predominantly aromatic solvent oil which boils within the range 200 to 800° F., and the remainder a vacuum distillation residuum derived from a petroleum oil boiling above 400° F.

13. A composition according to claim 12 wherein said carbon is a carbon black and is present in an amount in the range 20 to 70 weight percent, said solvent oil boils in the range 400 to 750° F., and said residuum is derived from a petroleum oil which boils above 700° F.

14. A composition according to claim 13 wherein said carbon black is a lamp black, said solvent oil is an extract oil obtained by extracting an aromatic gas oil with sulfur dioxide, and said residuum is obtained by vacuum reduction of a residual fuel oil which boils above 400° F.

15. A process which comprises mixing a solid filler selected from the group of carbon type materials consisting of the carbon blacks and graphite with a liquid carbonaceous material comprising a major proportion of petroleum cracking stock boiling predominantly above 400° F. reducible to pitch, and distilling the mixture to obtain a pitchy residue.

16. The process of producing a high solids content pitch suitable as a binder for carbonaceous material in the manufacture of electrodes, comprising the process of incorporating into a petroleum cracking stock boiling predominantly above 400° F., a substantial proportion of a solid filler selected from the group of carbon type materials consisting of the carbon blacks and graphite, subjecting the mixture to cracking conditions in a cracking zone to increase the coke solids content, distilling the cracked mixture to remove light ends produced in cracking, and vacuum distilling the remainder to yield a high solids content pitch suitable as a binder for such electrodes.

17. The process of claim 16 in which the incorporation of the carbon black type material in the petroleum cracking stock is accomplished by quenching the effluent smoke containing suspended carbon black coming from a carbon black production zone with a spray of said petroleum cracking stock, and thereby separating said suspended carbon black from the off-gas in said smoke.

References Cited in the file of this patent

UNITED STATES PATENTS

| | | |
|---|---|---|
| 1,653,520 | Reeve | Sept. 27, 1927 |
| 2,028,922 | Rose | Jan. 28, 1936 |
| 2,128,220 | Cooke | Aug. 30, 1938 |
| 2,178,770 | Zaisser | Nov. 7, 1939 |
| 2,237,339 | De Florez | Apr. 8, 1941 |
| 2,340,847 | Parkes | Feb. 1, 1944 |
| 2,418,135 | Moore | Apr. 1, 1947 |
| 2,453,641 | Reed | Nov. 9, 1948 |
| 2,599,633 | Hoffmeister et al. | June 10, 1952 |

FOREIGN PATENTS

| | | |
|---|---|---|
| 508,008 | Great Britain | June 23, 1939 |
| 568,705 | Great Britain | Apr. 17, 1945 |

UNITED STATES PATENT OFFICE
CERTIFICATE OF CORRECTION

Patent No. 2,826,507            March 11, 1958

Paul M. Waddill

It is hereby certified that error appears in the printed specification of the above numbered patent requiring correction and that the said Letters Patent should read as corrected below.

Column 1, line 36, for "electromechanical" read -- electrochemical --; column 2, line 40, for "furthen" read -- further --; column 8, lines 27 and 28, strike out "predominately aromatic oil,"; line 29, after "graphite," insert -- a predominately aromatic oil, --; column 9, line 12, list of references cited, under "UNITED STATES PATENTS", for the patent number "1,653,520" read -- 1,643,520 --.

Signed and sealed this 19th day of August 1958.

(SEAL)
Attest:

KARL H. AXLINE                               ROBERT C. WATSON
Attesting Officer                           Commissioner of Patents